(12) United States Patent
Raybon et al.

(10) Patent No.: US 10,017,334 B2
(45) Date of Patent: Jul. 10, 2018

(54) DUAL LUMBER STACKER AND METHOD OF STACKING LUMBER

(71) Applicant: Baxley Equipment Co., Hot Springs, AR (US)

(72) Inventors: Chris Raybon, Hot Springs, AR (US); Russell Kennedy, Hot Springs, AR (US); Pat Conry, Hot Springs, AR (US)

(73) Assignee: BAXLEY EQUIPMENT CO., Hot Springs, AR (US)

( * ) Notice: Subject to any disclaimer, the term of this patent is extended or adjusted under 35 U.S.C. 154(b) by 0 days.

(21) Appl. No.: 15/590,739

(22) Filed: May 9, 2017

(65) Prior Publication Data

US 2017/0327324 A1 Nov. 16, 2017

Related U.S. Application Data

(60) Provisional application No. 62/334,196, filed on May 10, 2016.

(51) Int. Cl.
| | | |
|---|---|---|
| *B65G 57/02* | (2006.01) | |
| *B65H 31/32* | (2006.01) | |
| *B65B 35/14* | (2006.01) | |
| *B65G 25/02* | (2006.01) | |
| *B65G 57/03* | (2006.01) | |
| *B65G 57/10* | (2006.01) | |
| *B65G 57/18* | (2006.01) | |
| *B65G 25/04* | (2006.01) | |

(52) U.S. Cl.
CPC ........... *B65G 57/035* (2013.01); *B65G 25/02* (2013.01); *B65G 25/04* (2013.01); *B65G 57/10* (2013.01); *B65G 57/18* (2013.01); *B65G 2201/0217* (2013.01); *B65G 2201/0282* (2013.01)

(58) Field of Classification Search
CPC ........ B65H 31/32; B23Q 7/001; B23Q 7/003; B65G 57/10; B65G 57/005; B65G 57/18; B65G 57/245; B65G 25/02; B65G 57/06; B65B 35/14
USPC ...... 198/468.6, 468.7, 598, 736, 774.3, 776; 414/746.6, 791.6, 794.1
See application file for complete search history.

(56) References Cited

U.S. PATENT DOCUMENTS

| | | | | |
|---|---|---|---|---|
| 2,861,702 | A * | 11/1958 | Mason | B65G 57/18 414/789.5 |
| 3,606,310 | A * | 9/1971 | Larson | B65G 57/14 271/189 |
| 3,679,072 | A * | 7/1972 | Mueller | B65H 31/32 198/468.7 |
| 3,737,052 | A * | 6/1973 | Lunden | B65G 57/18 414/793.8 |
| 3,737,053 | A * | 6/1973 | Lunden | B65G 57/18 414/791.8 |
| 3,743,113 | A * | 7/1973 | Eaton | B65G 57/18 414/789.5 |

(Continued)

*Primary Examiner* — Gregory W Adams
(74) *Attorney, Agent, or Firm* — Jeffrey S. Melcher; Manelli Selter PLLC

(57) ABSTRACT

Provided is a dual lumber stacker assembly having two stackers constructed to remove lumber from a conveyor and stack the lumber. The arms are moved forward and aft by associated crank drives. The arms are moved upwards and downwards by associated cam drives. Also provided is a method stacking lumber using the dual lumber stacker.

15 Claims, 5 Drawing Sheets

(56) References Cited

U.S. PATENT DOCUMENTS

| | | | | |
|---|---|---|---|---|
| 3,760,959 A | * | 9/1973 | Newnes | B65G 57/18 414/791.6 |
| 3,874,521 A | * | 4/1975 | Lunden | B65G 57/18 271/189 |
| 3,904,044 A | * | 9/1975 | Lunden | B65G 57/18 414/789.5 |
| 3,904,046 A | * | 9/1975 | Lunden | B65G 57/10 271/189 |
| 3,904,047 A | * | 9/1975 | Lunden | B65G 57/10 414/789.5 |
| 4,057,150 A | * | 11/1977 | Lunden | B65G 57/035 271/189 |
| 4,253,787 A | * | 3/1981 | Lunden | B65G 57/245 414/789.5 |
| 4,286,422 A | * | 9/1981 | Howe, Jr. | B65B 35/14 198/775 |
| 4,290,723 A | | 9/1981 | Johansson | |
| 5,613,827 A | | 3/1997 | Vande Linde | |
| 5,720,592 A | * | 2/1998 | Gillingham | B65G 57/005 414/789.5 |
| 5,993,145 A | * | 11/1999 | Lunden | B65G 57/18 414/789.5 |
| 6,655,902 B2 | | 12/2003 | Dube | |
| 6,722,844 B2 | * | 4/2004 | Lunden | B65G 57/005 414/789.5 |
| 7,201,554 B2 | | 4/2007 | Hogue | |
| 7,651,314 B2 | | 1/2010 | Hogue | |
| 8,746,441 B2 | * | 6/2014 | Esser | B23Q 7/001 198/774.3 |

\* cited by examiner

US 10,017,334 B2

DUAL LUMBER STACKER AND METHOD OF STACKING LUMBER

This application claims priority to U.S. provisional application No. 62/334,196 filed 10 May 2016, the complete disclosure of which is incorporated herein by reference.

FIELD OF THE INVENTION

The invention relates to a dual lumber stacker and method for stacking lumber being conveyed on a conveyor.

BACKGROUND OF THE INVENTION

Lumber products are typically manufactured in a variety of lengths, ranging from about six feet up to twenty four feet, e.g., conventional dimension lumber is usually manufactured in lengths of 6, 8, 10, 12, 14, 16, 18, 20 and 24 feet, respectively. Following manufacture, this lumber is sorted according to length, width, thickness and grade and then bundled in packages according to the dimensions and grade of the lumber. That is, all boards (lumber) having nominal dimensions of two inches by eight inches by eight feet, for example, and having a pre-determined grade, i.e., grade 1, grade 2 etc., are bundled together in a package (stack) of from about 50 to 300 boards, and these packages are then shipped to various points of use and/or sale. Similar packages are formed of lumber having different dimensions and grade.

Various machinery has been developed in the prior art to automatically sort and stack lumber products. Some prior art machinery is capable of handling lumber in a variety of lengths and some includes independently operable stacker arms. However, all such prior art machinery is relatively complex and expensive in construction and operation. Moreover, conventional lumber stacking machinery sometimes will not operate quickly enough to keep up with other pieces of equipment in a lumber mill.

U.S. Pat. No. 4,290,723 (Johansson), issued 22 Sep. 1981; U.S. Pat. No. 5,613,827 (Vande Linde), issued 25 Mar. 1997; and U.S. Pat. No. 6,655,902 (Dube), issued 2 Dec. 2003, all disclose dual lumber stackers. The complete disclosures of all three of these patents is incorporated herein by reference.

U.S. Pat. No. 7,201,554 (Hogue), issued 10 Apr. 2007, U.S. Pat. No. 7,651,314 (Hogue), issued 26 Jan. 2010, disclose a dual stacker that is complicated.

There is need for lumber stacking machinery that is simple and inexpensive in construction and operation, and which operates at a relatively high speed so that stacking of the lumber to form stacks can proceed at a pace equivalent to the pace of operation of other machinery in the process. Further, such machinery should be capable of continued operation while maintenance or repair is being performed, and should be capable of handling all normal sizes of lumber products without requiring adjustment or modification of the machine.

SUMMARY OF THE INVENTION

An object of this invention to provide a lumber stacking machine which is simple and inexpensive in construction and operation, and which operates at a rate of speed substantially greater than conventional lumber stacking machines.

Another object of the invention is to provide a lumber stacking machine that is capable of handling all conventional sizes of dimension lumber, ranging in length from about 6 feet up to about 24 feet.

A further object of the invention is to provide a lumber stacking machine in which a plurality of lumber stacking arms are operated to engage and move a plurality of boards arranged in a lumber course to form a stack of such courses, thereby making a package, and in which some of the arms are operated independently of the others so that one set of arms can continue to operate even if the other set of arms is not.

Yet another object of the invention is to provide a lumber stacking machine incorporating dual sets of independently actuatable lumber stacking arms arranged to operate out of phase with one another, but synchronized for alternating movement, thereby effectively doubling the speed of operation of the machine.

A still further object of the invention is to provide a lumber stacking apparatus having a plurality of stacker arms that engage and stack successive courses of lumber, and wherein a minimum number of simple and inexpensive parts are used.

These and other objects and advantages of the invention can be obtained by a lumber stacker comprising:

a conveyor having a conveyor end portion, and the conveyor being constructed to convey lumber in a conveying direction towards the conveyor end portion;

a first stacker located at the conveyor end portion; and a second stacker located at the conveyor end portion, the first and second stackers being constructed to remove lumber from the conveyor end portion and form a stack of lumber, wherein each of the first and second stackers comprising:

a plurality of elongate, parallel stacker arms each having a longitudinal axis arranged parallel to the conveying direction, the arms being spaced so that multiple arms engage and support each lumber being removed from the conveyor end portion, the arms being connected together so that they operate in unison;

the arms each having a rearward end oriented toward the conveyor end portion and an opposite, forward end toward where a stack of lumber is to be formed by the stacker, the rearward end of the arms being connected to a rotatable crank drive operable to move the arms in a first arm direction away from the conveyor end portion and a second arm direction towards the conveyor end portion, and the arms being connected to a rotatable cam drive operable to move the arms in an upward arm direction away from a top surface of the conveyor and a downward arm direction towards the top surface of the conveyor, the rotatable cam having an outer cam surface, the arm being connected to a cam follower that rides against the outer cam surface;

a drive shaft connecting the rotatable crank drive and the rotatable cam drive, wherein during operation the arms move in the upward arm direction and first arm direction to lift and move lumber in the first arm direction and then in the downward arm direction and second arm direction to deposit the lumber on a stack, and wherein the arms of the first stacker can operate independently from the arms of the second stacker; and at least one motor constructed to rotate the drive shaft.

The objectives and advantages of the invention can also be obtained by a method comprising providing the dual stacker, conveying lumber on the conveyor, and lifting the lumber from the conveyor using the stacker to form the stack of lumber.

BRIEF DESCRIPTION OF THE DRAWINGS

The foregoing, as well as other objects and advantages of the invention, will become apparent from the following detailed description when considered in conjunction with the accompanying drawings, wherein like reference characters designate like parts throughout the several views, and wherein.

DETAILED DESCRIPTION OF THE INVENTION

Figure 1:
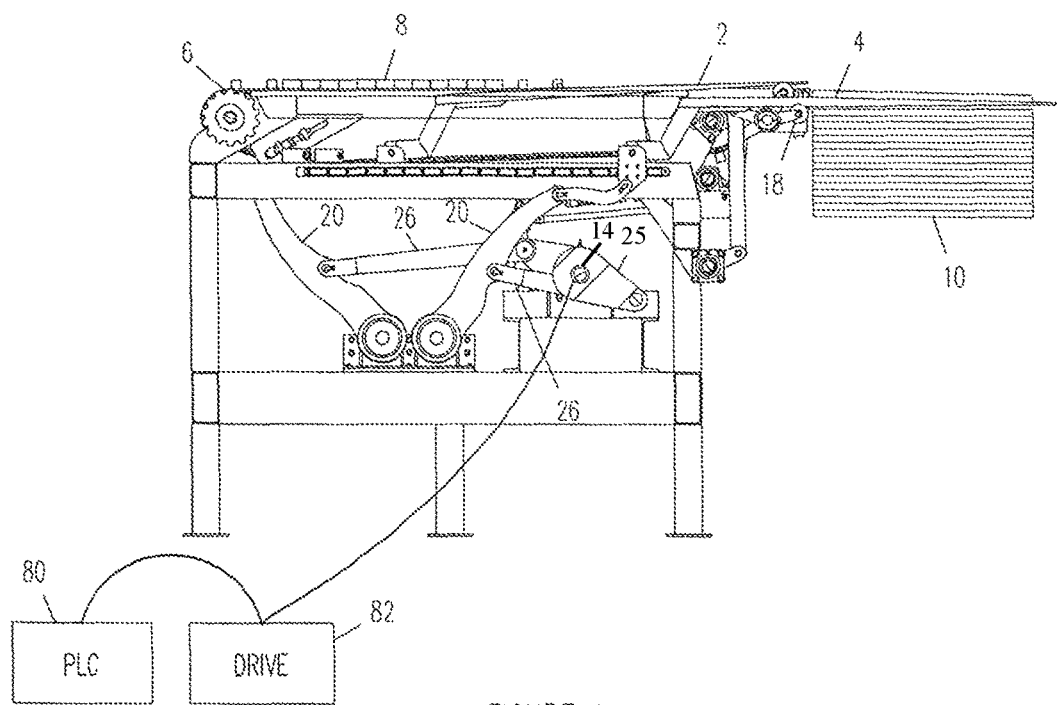
FIG. 1 illustrates a side view of an exemplary dual stacker.
Figure 2:
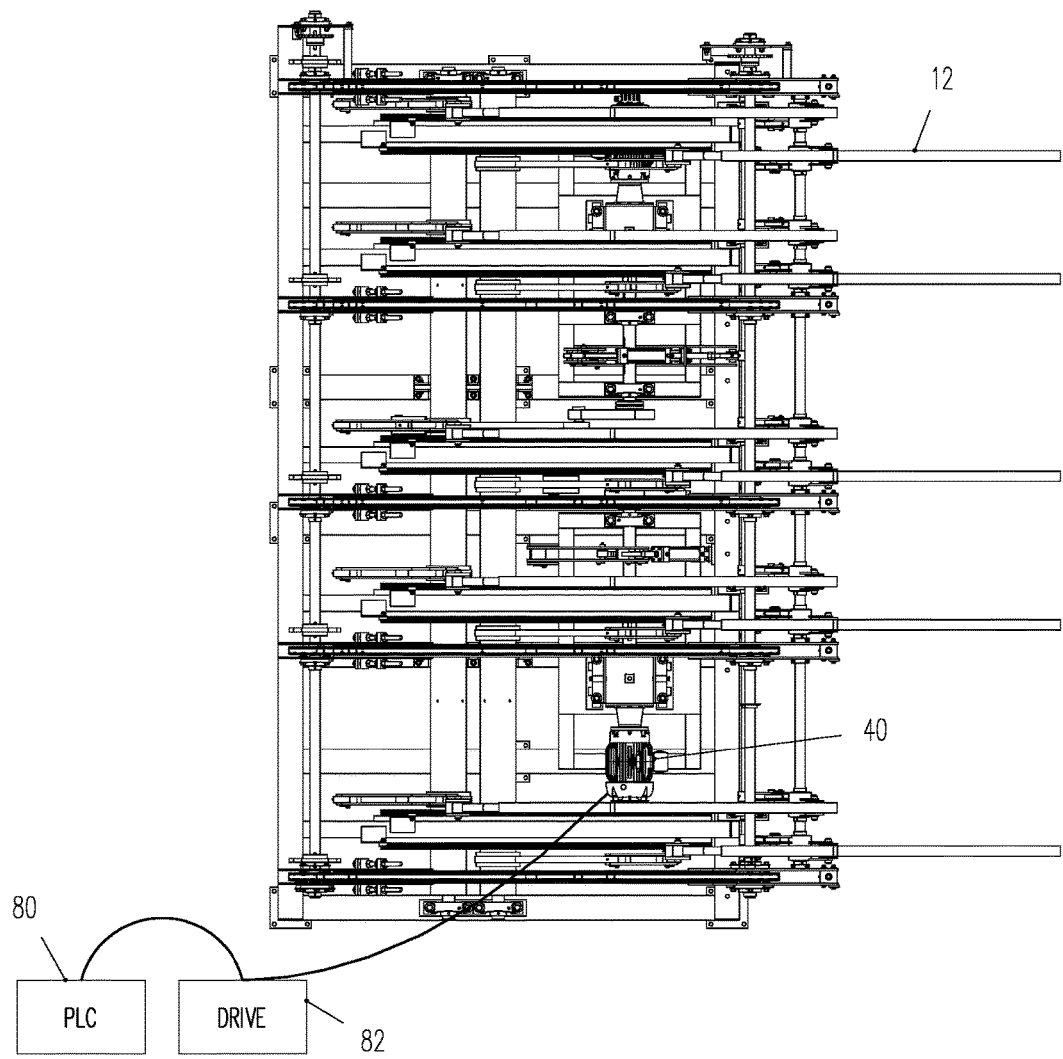
FIG. 2 illustrates a top view of an exemplary dual stacker.
Figure 3:
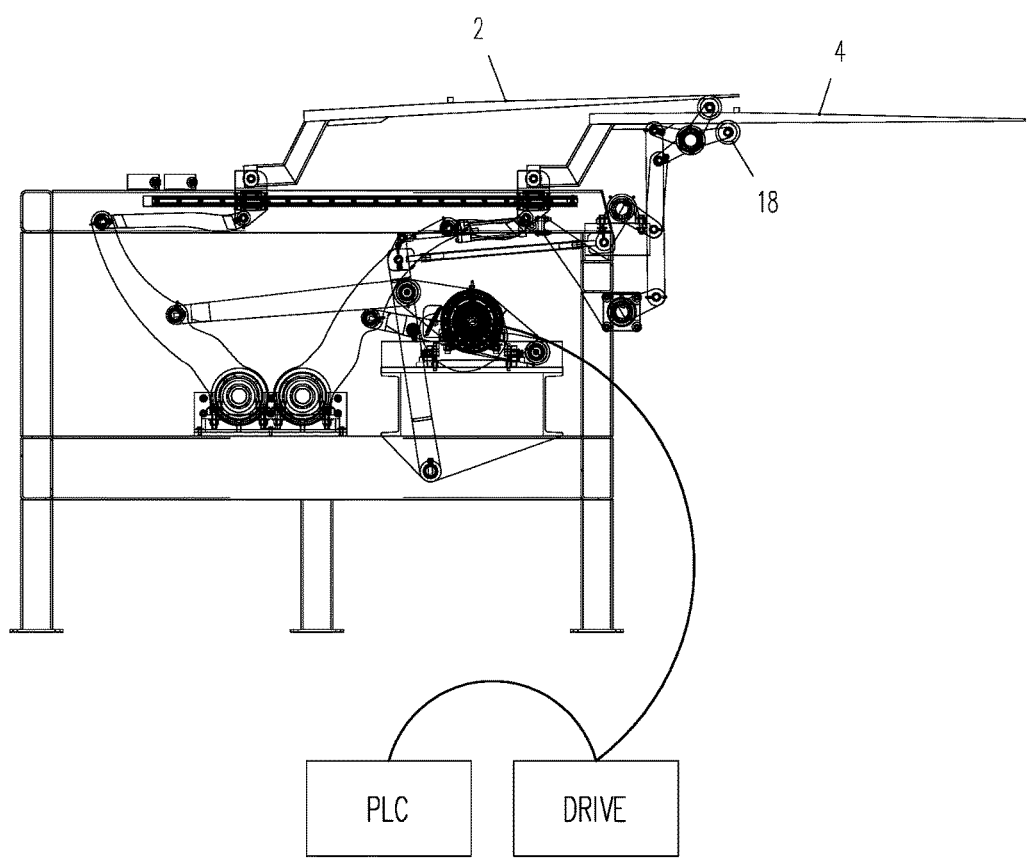
FIG. 3 illustrates a side view of an exemplary dual stacker.
Figure 4:
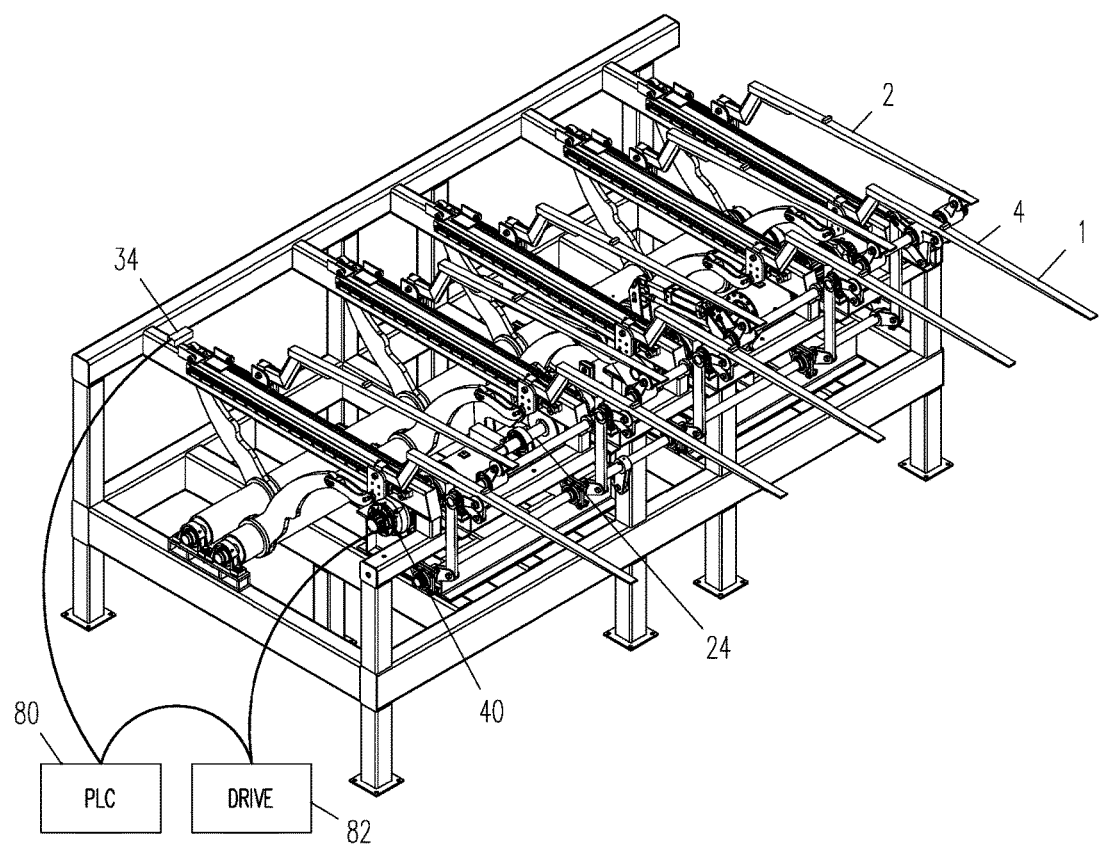
FIG. 4 illustrates a perspective view of an exemplary dual stacker.
Figure 5:
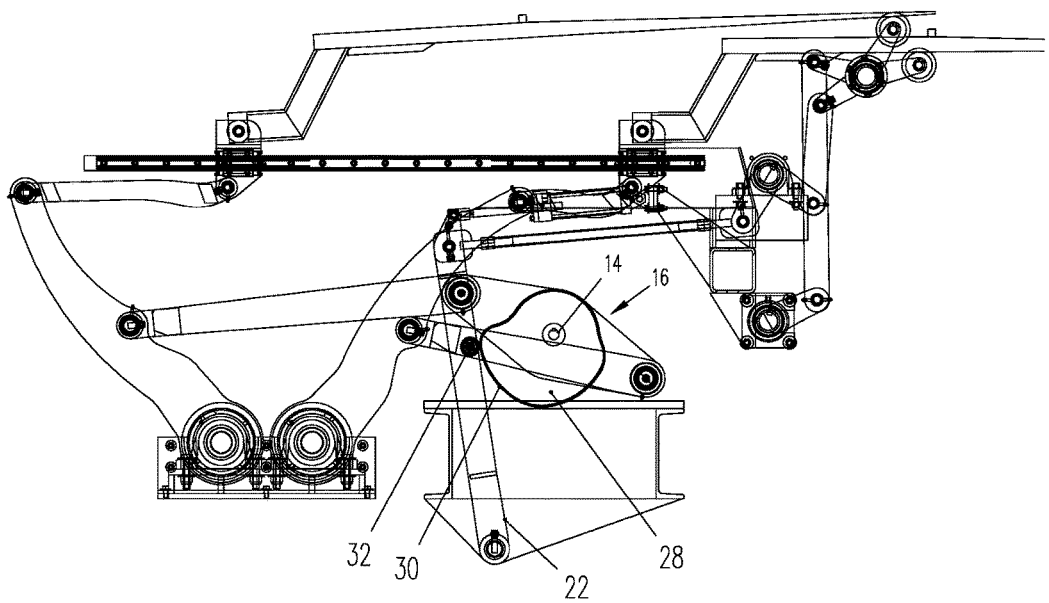
FIG. 5 illustrates a side view of the crank and cam mechanism.

The invention will now be explained with reference to the attached non-limiting FIGS. 1-5. The dual stacking apparatus of the invention comprises a first stacker 2 and a second stacker 4 located at an end of a conveyor 6. The conveyor 6 is constructed to convey lumber (boards) 8. The dual stacking apparatus removes the lumber 8 from the conveyor 6 and stacks the lumber 8 in a stack 10.

Each stacker 2, 4 comprises plurality of elongate stacking arms 12 arranged transversely to the longitudinal axis of the lumber 8 supplied on the conveyor 6, and operate to engage and lift a course of lumber 8 on the conveyor 6 and to move that course of lumber 8 forwardly and lower it to form a stack 10 of lumber 8 and to then withdraw into a position for engaging and lifting a subsequent course of lumber 8 to move the subsequent course forwardly and deposit the subsequent course onto the stack 10 to form a package formed of multiple courses of lumber 8. The arms 12 of stacker 2 are connected together so that they operate in unison. The arms 12 of stacker 4 are connected together so that they operate in unison.

The arms 12 are connected at their rearward ends to a crank arm 26 so that the rearward end of the arms 12 is constrained to move fore and aft in relation to an end of the conveyor 6. The arms 12 are connected a cam drive 16 to move the arms 12 up and down in relation to a surface of the conveyor 6.

The arms 12 are supported between their ends on a slide bearing 18. The forward ends of the arms 12 project beyond the slide bearing 18 to a free end which is moved fore and aft and up and down in relation to the conveyor 6 so that lumber 8 on the conveyor 6 can be lifted off of the conveyor 6, moved forward away from the end of the conveyor 6 and moved downward to be deposited to form the stack 10. The cam drive 16 can be connected to the slide bearing 18 to lift the and lower the slide bearing 18 which then lifts and lowers the arms 12.

The drive shaft 14 comprises a crank drive 25 and a crank arm 26 connected off center of the rotating shaft 14 by the crank drive 25, so as the drive shaft 14 is rotated the crank arm 26 moves fore and aft to provide a linear motion. The crank arm 26 is connected to the crank lever 20 to increase the linear motion. The crank lever 20 is connected to the arms 12. In this example, the arms 12 can be moved fore and aft (horizontally) in relation to an end of the conveyor 6 as the crank arm 26 moves during rotation of the shaft 14.

The drive shaft 14 comprises a rotatable cam 28 having an outer cam surface 30. A cam follower 32 rides on the cam surface 30 so that when the cam 28 is rotated the cam follower 32 moves up and down the cam surface 30 to provide linear motion. The cam follower 32 is connected to a cam lever 22 to increase the linear motion. The cam lever 22 is connected to the slide bearing 18. In this example, the arms 12 can be moved up and down (vertically) in relation to a surface of the conveyor 6 as the cam follower 32 moves when the cam 28 is rotated by the shaft 14.

The drive shaft 14 can be rotated at a constant rate during use to provide acceleration and deceleration of the respective linear movements, which translates to non-adjustable acceleration and deceleration of the arms 12 in both the horizontal and vertical directions as the motor 40 is operated at the constant rate. In other words, the acceleration and deceleration is controlled by the harmonic (sinusoidal) motion inherent in the crank drive (horizontal motion), and cam shape (vertical motion). Since the cams 28 and the cranks 26 are mounted on the same shaft 14, the relative speeds of the cams 28 and cranks 26 are not adjustable. The cam 28 cannot be operated independently of the cam 28 for the same stacker since they are both connected to the same shaft 14.

At least one motor 40 is used to drive the stackers 2, 4. One motor 40 can be used to drive both stackers 2, 4. However, preferably two motors 40 are used, one for each of the stackers 2, 4. The motor 40 connects to the drive shaft 14.

A start-end sensor 34 is constructed to determine the start or stop position of the arm 12. The start and end position of the arm 12 is the same location. Preferably, there are no sensors or other devices to determine the location of the arms 12 during the cycle, other than the start and end position. In this manner, preferably the computer 80 connected to the dual stacker cannot know the location of the arms 12 throughout the cycle other than the start and end position. Using the sensor 34, the dual stacker can be timed to move a course of lumber from the conveyor 6 to the stack 10.

The motor(s) 40 and sensors 34 can be connected to any computer system (PLC) 80 used in lumber mills. A drive 82 can also be utilized if desired. A commercial example of the PLC 80 is an A.B.ControLogix 5000 series. Any suitable start-end sensor 34 can used, such as mechanical, photoelectric, laser, or other. Any suitable motor 40 can be used, such as conventional electric motors previously utilized in prior art stackers.

The stackers 2, 4 can be operated independently so that one can be stopped while the other is operating. With the arrangement, the rate of speed of operation of the dual stacker is greatly increased over conventional stackers. The stackers 2, 4 can be operated in the same manner as conventional stackers, however in a more economical manner, requiring fewer and less expensive parts and components than prior art devices and the longevity is increased.

While particular embodiments of the invention have been illustrated and described in detail herein, it should be understood that various changes and modifications may be made to the invention without departing from the spirit and intent of the invention as defined by the scope of the appended claims.

The invention claimed is:

1. A lumber stacker comprising:
    a conveyor having a conveyor end portion, and the conveyor being constructed to convey lumber in a conveying direction towards the conveyor end portion;

a first stacker located at the conveyor end portion; and
a second stacker located at the conveyor end portion, the first and second stackers being constructed to remove lumber from the conveyor end portion and form a stack of lumber, wherein each of the first and second stackers comprising:
a plurality of elongate, parallel stacker arms each having a longitudinal axis arranged parallel to the conveying direction, the arms being spaced so that multiple arms engage and support each lumber being removed from the conveyor end portion, the arms being connected together so that they operate in unison;
the arms each having a rearward end oriented toward the conveyor end portion and an opposite, forward end toward where a stack of lumber is to be formed by the stacker, the rearward end of the arms being connected to a rotatable crank drive operable to move the arms in a first arm direction away from the conveyor end portion and a second arm direction towards the conveyor end portion, and the arms being connected to a rotatable cam drive operable to move the arms in an upward arm direction away from a top surface of the conveyor and a downward arm direction towards the top surface of the conveyor, the rotatable cam having an outer cam surface, the arm being connected to a cam follower that rides against the outer cam surface;
a drive shaft connecting the rotatable crank drive and the rotatable cam drive, wherein during operation the arms move in the upward arm direction and first arm direction to lift and move lumber in the first arm direction and then in the downward arm direction and second arm direction to deposit the lumber on a stack, and wherein the arms of the first stacker can operate independently from the arms of the second stacker; and
at least one motor constructed to rotate the drive shaft.

2. The lumber stacker according to claim 1, further comprising a crank lever arm connected between the arms and the crank to increase a travel distance of the arms in the first and second arm directions.

3. The lumber stacker according to claim 1, further comprising a cam lever arm connected between the arms and the cam to increase a travel distance of the arms in the upwards and downward arm directions.

4. The lumber stacker according to claim 1, further comprising a switch constructed to determine a start or stop position of the arms.

5. The lumber stacker according to claim 1, further comprising a computer system connected to the motor.

6. The lumber stacker according to claim 5, wherein a location of the arms after starting a cycle is not known by the computer system.

7. The lumber stacker according to claim 5, wherein the stacker is free of sensors to determine the position of the arms after starting a cycle.

8. The lumber stacker according to claim 5, further comprising a switch constructed to determine a start or stop position of the arms.

9. The lumber stacker according to claim 7, further comprising a switch constructed to determine a start or stop position of the arms.

10. The lumber stacker according to claim 1, wherein the first and second stackers are constructed such that as the crank drive and cam drive are rotated at a constant rate during use the crank drive and cam drive will provide non-adjustable acceleration and deceleration of the arms in both the horizontal and vertical directions as the motor is operated at the constant rate.

11. The lumber stacker according to claim 1, wherein the first stacker is alongside the second stacker.

12. The lumber stacker according to claim 1, wherein the second stacker is downstream of the first stacker.

13. The lumber stacker according to claim 1, wherein the cam drive cannot be operated separately from the crank drive on the first stacker and the cam drive cannot be operated separately from the crank drive on the second stacker.

14. The lumber stacker according to claim 1, wherein at least one of arms of the first stacker is located between the arms of the second stacker.

15. A method of stacking lumber comprising:
providing a stacker according to claim 1;
conveying lumber on the conveyor;
lifting a course of the lumber from the conveyor using the stacker to form a stack of lumber.

* * * * *